HIGH SPEED SWITCHING CIRCUITS

Filed May 12, 1961 2 Sheets-Sheet 1

INVENTORS
JAMES L. WALSH
JOHN R. TURNBULL
FRED K. BUELOW

BY Joseph C. Redmond, Jr.
ATTORNEY

Nov. 16, 1965 J. L. WALSH ETAL 3,218,466

HIGH SPEED SWITCHING CIRCUITS

Filed May 12, 1961 2 Sheets-Sheet 2

United States Patent Office 3,218,466
Patented Nov. 16, 1965

3,218,466
HIGH SPEED SWITCHING CIRCUITS

James L. Walsh, Hyde Park, John R. Turnbull, Wappingers Falls, and Fred K. Buelow, Poughkeepsie, N.Y., assignors to International Business Machines Corporation, New York, N.Y., a corporation of New York Filed May 12, 1961, Ser. No. 109,561
12 Claims. (Cl. 307—88.5)

This invention relates to switching circuits and, more particularly, to high speed switching circuits adapted to perform logic operations in information handling apparatus, as for example, computer systems.

Switching circuits adapted for power gain and non-inverting logic operation have heretofore been accompanied by voltage deterioration or shift between input and output voltage signals. Correction of the voltage shift has required additional circuit blocks to be included in the information handling apparatus which increases the cost thereof. Also, a series of non-inverting logic circuits causes a degeneration in the rise time of the output pulse due to a lack of voltage gain. Finally, such circuitry when capacitively loaded presents a negative resistance to a signal source, the negative resistance in combination with the inductance of the signal source forming a tuned circuit that generatees oscillations which introduce erroneous signals into the data being processed by the apparatus. It is desirable, therefore, to eliminate these limitation upon non-inverting logic blocks having power gain so that a simple and inexpensive basic circuit block will be available for information handling apparatus.

A general object of the invention is an improved non-inverting logic block which reduces the number of circuit blocks required for information handling apparatus.

One object is a non-inverting logic circuit that provides output signals which are substantially rectangular in shape and at the same voltage level as input signals supplied to the circuit.

Another object is a non-inverting logic circuit adapted to have output voltage changes equal to or greater than input voltage changes supplied to the circuit.

Still another object is a non-inverting logic circuit that presents a positive resistance characteristic to a signal source.

A specific object is an emitter follower circuit that has voltage gain.

Another specific object is an emitter follower circuit employing a bistable semiconductor device which improves the performance of the circuit.

These and other objects are accomplished in accordance with the present invention, one illustrative embodiment of which comprises a transistor connected in a circuit configuration that provides an output signal in the same phase relation as an input signal. The transistor is normally biased into a slightly conducting state by suitable means. One of the transistor electrodes is connected to one terminal of a bistable semiconductor device having a negative resistance, the other terminal of the bistable device being connected to a source of reference potential. When an input signal switches the transistor into a higher conducting state, an output signal appears between the one terminal of the bistable device and the other terminal connected to the reference potential. The output signal has a voltage change equal to or greater than the input signal change applied to the transistor. Moreover, the bistable device has a low resistance which assists in producing a positive resistance characteristic to the signal source. Additionally, the negative resistance characteristic of the bistable device improves the rise time of the output pulse.

One feature of the invention is a bistable semiconductor device which is connected between the emitter electrode of a transistor and a reference potential to improve the switching speed of the transistor and provide voltage gain to an output ciricuit connected across the device.

Another feature is an emitter follower having a low resisstance in the output circuit thereof to assist in developing a positive resistance characteristic to a signal source connected to the emitter follower.

Still another feature is an emitter follower circuit and a bistable device, the voltage current characteristics of each device when matched, enhancing the voltage gain of the circuit.

Another feature is employing the diode characteristic of a transistor as a load on a bistable device to reduce the power requirements necessary to switch the device and provide enhanced voltage gain from the device with respect to an input signal.

The foregoing and other objects, features and advantages of the invention will be apparent from the following more particular description of preferred embodiments of the invention, as illustrated in the accompanying drawings.

In the drawings:

FIG. 1 is an electrical schematic of one embodiment of the present invention.

FIG. 1*a* is the embodiment of FIG. 1 arranged for an "OR" logic operation.

Figure 3A:
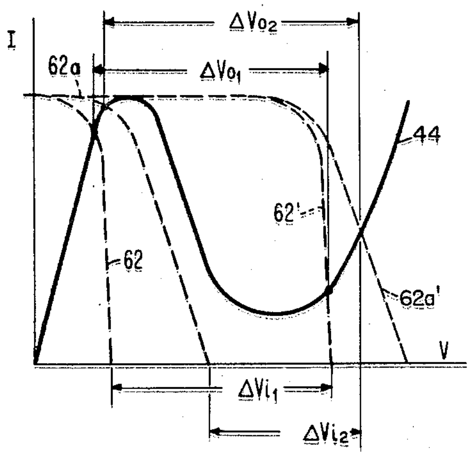
FIG. 3 is an electrical schematic of another embodiment of the invention.
Figure 3:
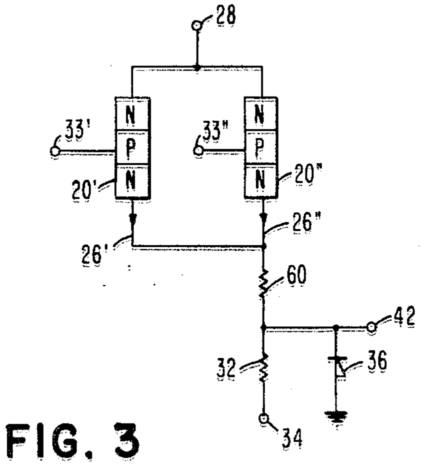

FIG. 3*a* is a voltage-current curve for a tunnel diode and a load line established by transistors and resistors included in FIG. 3.

Figure 4:
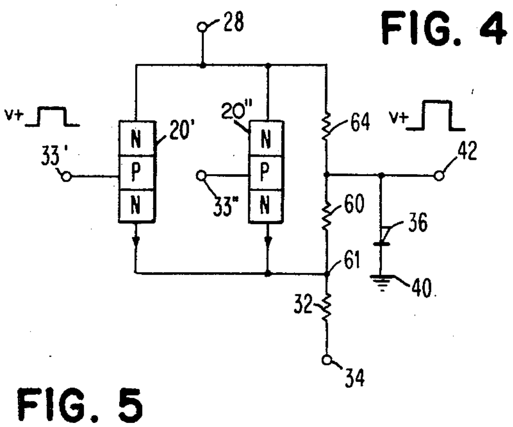

FIG. 4 is an electrical schematic of still another embodiment of the invention.

Figure 5:
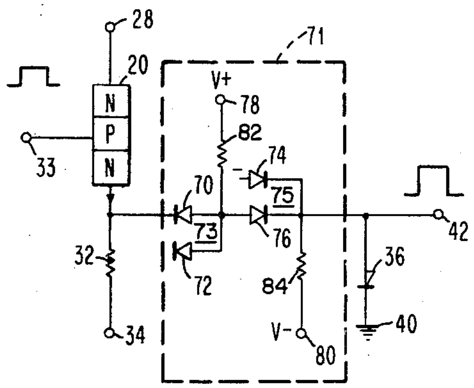

FIG. 5 is an electrical schematic of a circuit employing the principles of the invention to perform an "AND-OR" logic operation.

Figure 5A:
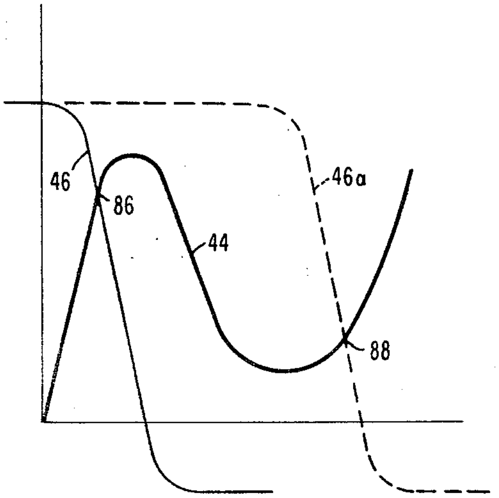

FIG. 5*a* is a voltage-current curve of a tunnel diode and a load line established by transistors and diodes included in FIG. 5.

Figure 6:
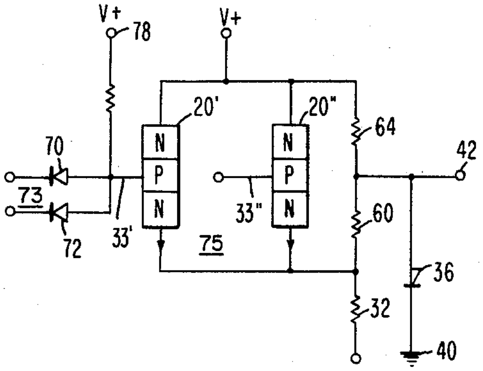
Figure 6A:
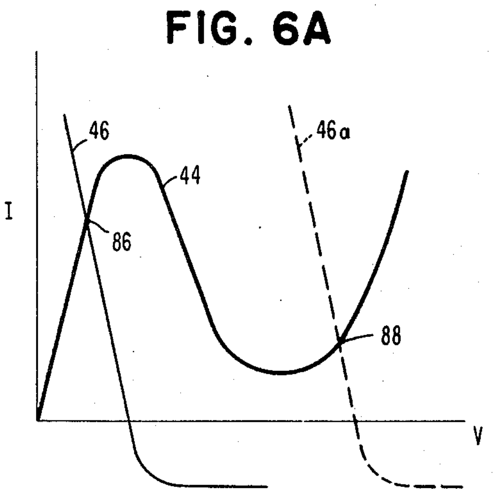

FIG. 6 is another electrical schematic of a circuit adapted to perform an "AND-OR" logic operation; and FIG. 6*a* is a voltage-current curve of a tunnel diode and a load line established by transistors and resistors included in FIG. 6.

Figure 1:
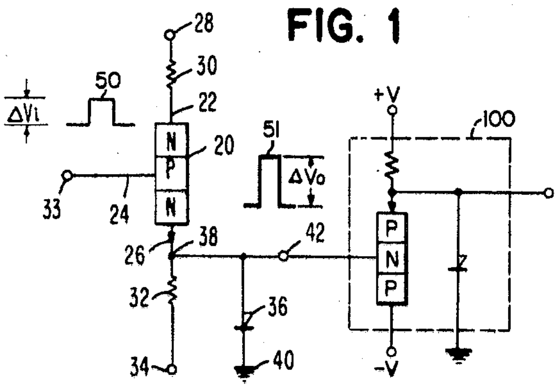

Referring to FIG. 1, a signal translating element or transistor 20 having a collector 22, base 24, and emitter electrode 26 is connected in a common collector or emitter follower circuit configuration. To this end, the collector is connected to a source of voltage 28 through a current limiting resistor 30. An input circuit 33 is connected to the base of the transistor. The emitter is connected through a load resistor 32 to a source of voltage 34 having a polarity opposite to that of the source 28. Also included in the emitter circuit is a bistable semiconductor device 36 having a negative resistance characteristic, one terminal of the device being connected to a junction 38 between the emitter electrode 26 and the resistor 32 and the other terminal of the device being connected to a source of reference potential 40, typically ground. An output circuit 42 is connected to the one terminal of the bisable device, an output signal appearing between the one terminal and the reference potential.

The bistable semiconductor device 36 shown in FIG. 1 is known to exist in several forms to a worker skilled in the art. One eminent satisfactory bistable device that has been recently developed is described in a recent article entitled, "New Phenomena in Narrow Germanium P-N Junction," Physical Review, vol. 109, 1958, pages 603 and 604 by Leo Esaki. The device described in the previously mentioned publication is commonly referred to as a tunnel or Esaki diode. The tunnel diode has been selected as a preferred element for use in the present invention because of the unique characteristics thereof. Accordingly, the remaining paragraphs of the description will be limited to switching circuits employing the characteristics of the tunnel diode, but it should be understood that other bistable devices may be employed in the present invention with satisfactory results.

Figure 2:
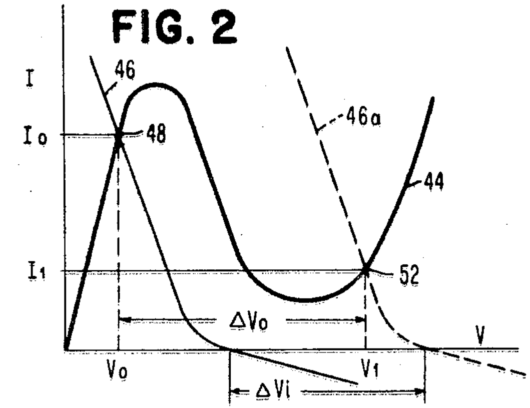
FIG. 2 is a voltage-current curve for a negative resistance device, typically a tunnel diode and a load line established by one junction of a transistor included in FIG. 1

The well known voltage-current characteristic of the bistable device 36 appears in FIG. 2 as curve 44. Superimposed on the device curve is a load line 46 due to the base-emitter junction of the transistor 20. The base-emitter junction characteristic is that of a conventional diode for reasons well known to a worker skilled in the art. In the quiescent condition or the absence of an input signal to the input circuit 33, the transistor is slightly conducting and an operating point 48 is established for the diode 36 by the intersection of the load line and the curve 44. The operating point establishes a current $I_0$ through the diode and a voltage $V_0$ across the diode, the source 28 supplying the current to the negative supply 34 in addition to that through the diode 36.

Having described the structure and quiescent operating condition of the embodiment shown in FIG. 1, operation thereof will next be described when a positive input pulse 50 having a magnitude $\Delta V_i$ is applied to the input terminal 33. Such an input pulse turns the transistor full conducting causing increased current to flow temporarily through the diode which, for reasons indicated in the previously mentioned article, switches to a second operating point 52 defined by the intersection between the curve 44 and the curve **46*a*. The later curve is the same as the curve 46 but displaced to the right due to the magnitude of the input pulse. At the second operating point, a current $I_1$ of magnitude less than $I_0$ flows through the diode and a voltage of $V_1$ appearss across the diode. The reduced current requirements of the diode 36 lowers the current flow through the transistor. The change in voltage that appears across the diode is indicated as $\Delta V_0$. This change which corresponds to pulse 51 (see FIG. 1), as seen from FIG. 2, is more than $\Delta V_i$, which corresponds to the magnitude of the input pulse 50. The increased voltage change appearing across the diode 36** is due in large part to the characteristics of the base-emitter junction which has a lesser voltage change than that across the tunnnel diode. Thus, the present invention discloses an emitter follower circuit having voltage gain.

The outputs of the circuit of FIG. 1 are at different voltage levels than those applied to the input circuit 33 due to the emitter-base drop and the voltage gain of the tunnel diode. The change in voltage levels is corrected by connecting a P-N-P emitter follower circuit 100 to the N-P-N emitter follower of FIG. 1. The tunnel diode for the P-N-P emitter follower is connected to the circuit in the same manner as the tunnel diode shown in FIG. 1, but the reference potential for the tunnel diode included in the P-N-P circuit is at a different level than that connected to the tunnel diode in the N-P-N circuit. With this slight change, the output voltage levels appearing at the P-N-P circuit are the same as those applied to the input of the N-P-N emitter follower.

In connection with FIG. 1, it should be noted that the circuit operates satisfactorily without the supply 34 and the resistor 32. The omission of these elements only reduces the current requirements of the source 28 without affecting the operation of the circuit. Also, the circuit operates as well with the diode 36 in the reverse position, that is, the anode connected to ground instead of the cathode connected to ground as in FIG. 1. With the anode connected to ground, however, the succeeding P-N-P stage requires the diode 36 to have its cathode connected to ground instead of its anode in order to have the output voltage levels the same as those applied to the input of the N-P-N circuit. When the diodes for the N-P-N and P-N-P stages are connected in this manner, the source of reference potential for each stage may be the same, that is, typically ground.

Normally, the output signal of an emitter follower is deteriorated due to the fact that the change in voltage of the emitter base junction subtracts from the change in voltage at the base. Since the emitter follows the base, the change at the emitter (or output) is reduced. It will be appreciated that a series of emitter followers in cascade without the presence of a tunnel diode will reduce the magnitude of the input voltage change sufficiently to the point where an emitter follower will not be turned on. The present invention, however, by the addition of the tunnel diode overcomes the change in drop across the base-emitter junction so that the same pulse can be applied to all stages of the emitter followers without a stage failing to turn on due to deterioration of the input pulse.

The tunnel diode 36 corrects another difficulty encountered in emitter follower circuits. When an input signal is applied to the conventional emitter follower circuit, the signal observes a negative resistance and a capacitance due to the capacitive effects of the subsequent transistors and other elements in parallel with the load. The combination of the negative resistance and the capacitance together with the inductance in the signal source develops a tuned circuit which generates oscillations. The tunnel diode, however, applies a low impedance path across these capacitive effects and essentially short circuits the capacitive effects to provide a positive resistance characteristic to the signal source. The positive resistance characteristic of the circuit eliminates any oscillations which otherwise would develop in the circuit due to the absence of a tunnel diode.

The tunnel diode reduces the switching time of a transistor since a regenerative effect occurs when the peak current of the tunnel diode is exceeded, the tunnel diode switching the output to the other operating point of the diode whether or not the base has reached final voltage level. This effect also reduces the power required to switch the circuit to provide an output therefrom. The combination of the fast switching time and the elimination of pulse deterioration previously described enables pulses substantially rectangular in shape to appear at the output of the circuit.

Figure 1A:
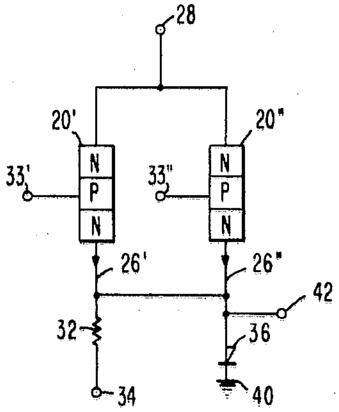

FIG. 1 has shown the tunnel diode in combination with a single transistor current switching block. It is believed apparent, that the diode may be used in combination with a plurality of transistors connected in parallel (see FIG. 1*a*) so that the circuit can perform either an "AND" or "OR" logic operation as described for example in U.S. application, Serial 835,943 to F. K. Buelow, filed August 25, 1959, now U.S. Patent No. 3,054,911, and assigned to the same assignee as that of the present invention. Also, the diode has satisfactory operation with either N-P-N or P-N-P transistor current switching blocks. For reasons of convenience, however, a single transistor N-P-N current switching block was chosen to facilitate explanation of the invention.

Another embodiment of the invention is shown in FIG. 3 wherein like elements to those shown in FIG. 1 have corresponding reference designations. Primed superscripts have been assigned to the reference designation where circuit elements are duplicated, as in the case of the transistors 20.

It will be noted that the embodiment shown in FIG. 3 has the tunnel diode in the reverse position to that shown in FIG. 1. Also, a resistor 60 has been included in the emitter circuits of the transistor 20, the resistor being connected between the emitter electrodes 26′ and 26″ and the output circuit 42. The purpose of the resistor 60 is to match the base-emitter characteristic of the transistors 20′ and 20″ to the negative resistance characteristic of the diode 36 where such is not the case. Matching the base-emitter and diode characteristics enhances the voltage gain of the diode for reasons which will become apparent hereinafter. The enhanced voltage gain will become evident upon considering the diode curve 44 and a load line 62 shown in FIG. 3*a*. The load line 62 is the diode curve for the base-emitter junction of the transistor 20. Without a resistor, the diode has a slope different from that of the negative resistance portion for the tunnel diode curve. As a consequence, when an input pulse of $\Delta V_{i_1}$ magnitude is applied to the transistor, the voltage shift across the diode will be $\Delta V_{o_1}$ which will be equal to or less than that of $\Delta V_{i_1}$. The reduced voltage change, for reasons previously described, will require correction before application to the necessary logic stage.

When the resistor 60 is placed in series with the base-emitter junction, a combined curve 62*a* for the resistor and junction results, the slope of which can be controlled by the resistor. Adapting the combined curve to have the same slope as that of the negative resistance characteristic of the tunnel diode, produces an output pulse $\Delta V_{o_2}$ as shown in FIG. 3*a*. The magnitude of $\Delta V_{o_2}$ is equal to or larger than that of the input pulse $\Delta V_{i_2}$ for reasons previously explained. Thus, the resistor 60 enhances the performance of the circuit shown in FIG. 1 since a wide variety of transistors may now be employed with a tunnel diode to produce improved voltage gain from the circuit.

Another embodiment of the invention is shown in FIG. 4 wherein like elements to those shown in FIG. 3 have corresponding reference designations. It will be noted in FIG. 4 that the circuit of FIG. 3 has been slightly rearranged. In particular, the resistor 60 besides being connected to the emitter is also connected through a resistor 64 to the collector of the transistor 20. The collector resistor 30 (see FIG. 3) has also been removed from the circuit. Finally, the output circuit 42 has been connected to the junction between the resistors 60 and 64. The circuit as shown provides an "OR" logic operation and has sufficient voltage gain to drive a similar circuit or the complementary logic operation to that shown in FIG. 4. Again, as in FIG. 3, the base-emitter characteristic is matched to the negative resistance of the diode by resistor 60.

Normally, the transistor is on or conducting due to the voltage level across the input circuit. The resistor 64 bleeds a portion of the current from the source 28. The drop across the resistor is the same as that across the transistor. As a consequence, the drop appears as a voltage rise to the input signal so that the volatge across the diode turns out to be the same as that across the input circuit. Thus, the present circuit eliminates voltage shift between input and output signal levels. When an input pulse is applied to turn off the transistor, increased current flow occurs through the diode which switches from the high voltage condition to the low voltage condition. The output voltage is substantially the same as that appearing in the input circuit due to the voltage appearing across the resistor 60. The feature of the resistor 60 permits the present circuit to drive a similar circuit of the complement thereof. Again matching the diode and the transistor corrects for voltage deterioration of the input pulse as previously explained. Removal of the input pulse decreases the current through the diode 36 which in turn switches back to the high voltage condition, the output voltage level corresponding to that appearing across the input circuit.

The output can also be taken at emitter node 61 instead of node 42. In this case, the negative resistance of diode 36 is matched to the emitter-base characteristics 20′ or 20″, because of resistor 60 modifying the characteristic of diode 36. The advantages described in conjunction with FIGS. 1 and 3 are retained, but the voltage translation of the present figure is lost. The revised circuit, however, teaches that the tunnel diode characteristic may be matched to the transistor emitter-base characteristic as well as vice versa. Thus, the present invention is not limited to the particular embodiments shown in FIGS. 1 and 3 but is capable of several variations in order to match the diode and transistor emitter-base characteristics.

A diode logic circuit having power gain is shown in FIG. 5. Like elements to those shown in FIGS. 3 and 4 have corresponding reference designations. The circuit is a combination of the emitter follower circuit shown in FIG. 1 and a diode logic circuit 71 shown enclosed by a dotted box. The diode logic circuit is adapted to perform an "AND-OR" operation and includes diodes 70, 72, 74, and 76 and voltage supplies 78 and 80 which include resistors 82 and 84 respectively. The "AND" section 73 of the logic circuit comprises diodes 70 and 72 having their anodes connected to the resistor 82 and their cathodes connected to input signals.

The "OR" section 75 comprises diodes 74 and 76, the cathodes of which are connected together to provide an output from the circuit 36. The anodes of the diodes are connected to the output of "AND" circuits. The voltage at the cathodes of the diodes is determined by the tunnel diode.

Inputs to the diode logic circuit 71 are from the emitters of transistors 20 only one of which is shown in FIG. 5. The output from the logic circuit is applied to a tunnel diode 36, the characteristics of which are matched to the sum of the resistance characteristics of diodes 70 and 76 and transistor 20. Thus, the circuit performs in the same manner as the other emitter follower circuits except the logic is performed by the diodes.

Normally, the transistor is fully conducting causing current to flow from the source 78 through the diode 76 to the negative supply 80 and the diode 36. As a consequence, the diode 36 is in the high current condition indicated by operating point 86 shown in FIG. 5*a*.

An input signal applied to the input circuit 33 turns off the transistor which forward biases the diode 70. Simultaneously, the anode voltage of the diode 76 decreases causing lower conduction thereof. Thus, the current requirements of the diode 36 are reduced, the diode 36 switching to a second operating point 88 indicated in FIG. 5*a*. The magnitude of the voltage change appearing across the diode 36 is adapted to be greater than that appearing at the input circuit 33. Moreover, the voltage gain of the diode overcomes pulse deterioration due to the current flow through the transistor and the diodes 70 and 76. In addition, diodes 70 and 76 and transistor 20 may be chosen so as to eliminate any voltage shift between input and output signal levels. Hence, this feature permits the circuit of FIG. 5 to be applied in cascade without the requirement of additional circuitry to correct the voltage shift and pulse deterioration.

The circuit shown in FIG. 5 may be rearranged in the manner shown in FIG. 6 wherein the diode "AND" section 73 is at the input of a transistor current switching "OR" circuit 75, the latter being connected in an emitter follower configuration substantially the same as that shown in FIG. 4. The "OR" section operates the same as that shown in FIG. 4 except that an input pulse is applied to the transistor when input signals appear at the cathodes of both "AND" diodes. Again, as in FIGS. 4 and 5, the diode 36 overcomes the pulse deterioration which would otherwise occur from the transistor "OR" circuit and the diode "AND" circuit. FIG. 6*a* shows the operating curve of the diode with a load line established by the base-emitter junction of the transistors. The load line, being substantially parallel to the negative resistance portions of the diode curve, produces improved voltage gain when pulses are applied to the input of the transistors.

Although the logic circuits of FIGS. 4, 5 and 6 have employed N-P-N transistors, it is believed evident that complementary logic function can be developed by substituting P-N-P transistors for the N-P-N transistors and reversing the polarities of the power supplies. N-P-N transistors were employed in the present circuit solely for reasons of convenience in describing the principles of operation of the present invention.

It is also believed evident that in the case of the logic circuit of FIGS. 5 and 6, the order of the "AND-OR" sections may be revised without affecting the improved operation. The particular arrangement indicated was selected for reasons of convenience only.

Finally, it should be noted that the resistors 60 and 64 included in the emitter circuits are only necessary so long as the emitter-base and diode characteristics do not match. It is possible, of course, to select a transistor and diode combination having like characteristics in which case the resistors are unnecessary. In the absence of such a selection, however, a resistor is desirable for improved performance of the circuit.

The present invention has described non-inverting logic circuits, typically emitter follower logic circuits with improved operation due to the cooperation between a tunnel diode and the base-emitter junction of an emitter follower circuit. The cooperation eliminates voltage shift and pulse deterioration, which otherwise limit the application of emitter follower circuits. In addition, the tunnel diode provides a low impedance path to ground for the emitter electrode which increases the switch speed of the transistor. Also, the low impedance path short circuits the capacitive effects appearing in the load from subsequent stages. Elimination of the capacitive effects prevents undesirable oscillations on the part of the emitter follower circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A switching circuit comprising a transistor, an input circuit connected to said transistor, means biasing the transistor for emitter-follower operation, an output circuit connected to said transistor and including a negative resistance device, said input circuit adapted to receive an input signal of at least a preselected magnitude to operate said transistor and provide an output signal across the negative resistance device which is in the same phase relation as the input signal, said negative resistance device having at least two operating points at two different voltage levels, the difference between the voltage levels being larger than the selected magnitude of the signal applied to the input circuit, the negative resistance device being normally at one operating point and switching to the other operating point when an input signal appears, the negative resistance device returning to the one operation point on release of the input signal whereby a signal appears in the output circuit that is of larger magnitude than that of the input signal.

2. A switching circuit comprising a transistor junction having base, emitter and collector and emitter electrodes, an input circuit connected to said base electrode, means for biasing the collector electrodes for operation of the transistor, a bistable semiconductor device connected directly between said emitter circuit and a source of reference potential, the bistable device normally being operated at a single operating point, said bistable device having an operating characteristic, one portion of which is matched to the operating characteristic for one junction of the transistor, and an output circuit connected across said bistable device.

3. The circuit defined in claim 2 wherein the bistable device is a tunnel diode, the transistor providing current to normally bias the diode at a single operating point.

4. A switching circuit comprising a junction transistor having base, emitter and collector electrodes, an input circuit connected to said base electrode, means for biasing the emitter and collector electrodes for operation of the transistor, a negative resistance device connected between a source of reference potential and the emitter electrode, and means for matching a portion of the operating characteristic for one junction of the transistor to a portion of the negative resistance device operating characteristic.

5. A switching circuit comprising a junction transistor having base, emitter and collector electrodes, an input circuit connected to said base, means for biasing the collector and emitter electrodes for operation of the transistor, a bistable device connected between a source of reference potential and the emitter electrode, the base emitter junction of the transistor having an operating characteristic which produces a defined voltage change at the emitter when an input signal is applied to the base, the bistable device having a negative resistance characteristic which is adjusted by means to correspond to the operating characteristic of the base emitter junction whereby the voltage change across the bistable device is larger than the voltage change across the base emitter junction.

6. A switching circuit adapted to perform a logic operation comprising at least two transistors having base, emitter and collector electrodes, means for applying input signals to the respective base electrodes, means for biasing the emitter and collector electrodes for operation of the transistors, an output circuit including a bistable semiconductor device connected to the emitters of the transistors and means for adjusting the output voltage of the circuit to correspond to that of the input signal and simultaneously eliminate input signal deterioration due to voltage drops introduced by the transistors included in the circuit.

7. A switching circuit comprising a junction transistor including a base, emitter and collector electrodes, a signal source connected to said base circuit, means for biasing the base and emitter electrodes for non-inverting signal operation of the transistor, an output circuit connected to the emitter and including a negative resistance device normally biased in a high current condition to provide a low impedance path to a reference potential such that capacitive effects from subsequent stages connected to the output circuit are essentially short circuited, said negative resistance device having an operating characteristic, a portion of which is matched to the operating characteristic of one junction of the transistor.

8. A switching circuit adapted to perform a logic operation comprising a diode logic circuit adapted to perform one or more logic operations and connected to an emitter-follower circuit including a junction transistor having base, emitter and collector electrodes, an input circuit connected to said base and adapted to receive input signals at a preselected voltage level, means for biasing the emitter and collector electrodes for operation of the transistor and an output circuit connected to the diode logic circuit, said output circuit including a bistable semiconductor device said device having an operating characteristic, one portion of the operating characteristic being matched to the operating characteristic for one junction of the transistor and connected to an emitter follower circuit including, the diode logic circuit and bistable device cooperating to provide an output signal which is not shifted in voltage level or deteriorated in magnitude with respect to the input signal and voltage level at the input circuit.

9. A switching circuit adapted to perform a logic operation comprising at least two transistors having their collectors connected to a source of potential of one polarity and their emitters connected to a source of potential of another polarity, input circuits including at least one diode logic circuit connected to the base electrodes, an output circuit connected to the emitters of said transistors, a bistable semiconductor device connected between the output circuit and a source of reference potential, and means for adjusting the output circuit signal level to correspond to the base electrode signal level.

10. A switching system comprising a first transistor of one conductivity having base, emitter and collector electrodes, an input circuit connected to the base, means biasing the collector and emitter electrodes, a first bistable device connected between the emitter and a first source of reference potential, a first output circuit connected across the bistable device, a second transistor of opposite conductivity having base, emitter and collector electrodes, the first output circuit connected to the base electrode of the second transistor, means biasing the collector and emitter electrodes of the second transistor, a second bistable device connected between the emitter of the second transistor and a second source of reference potential, and a second output circuit connected across the bistable device.

11. A switching circuit comprising a transistor including base, emitter and collector electrodes, an input circuit connected to the base electrode, means biasing the emitter and collector electrodes for operation of the transistor, a bistable semiconductor device and an impedance element connected together and having two terminals, one terminal connected to the emitter, the other terminal connected to a source of reference potential, a current source connected to the bistable device and the impedance element, and an output circuit connected across the bistable device.

12. A switching circuit comprising a transistor including base, emitter and collector electrodes, a voltage supply connected to the collector electrode, means biasing the emitter electrode, an input circuit connected to the base electrode, first and second serially connected impedance elements connected between the collector electrode and the emitter electrode, a bistable semiconductor device connected between the series connected impedance elements, and an output circuit connected across the bistable device.

References Cited by the Examiner

Lade, R. W.: "Logic Combines Tunnel Diodes With Transistors," Electronics, Mar. 3, 1961, pp. 46–47.

Electronics, Nov. 27, 1959, pages 60–64, "The Tunnel Diode-Circuits and Applications," by Lesk.

Todd, C. D.: "Combining Transistors With Tunnel Diodes," Electronics, vol. 33, Aug. 19, 1960, pp. 59–61.

Electronics, July 1960, pp. 26–29, "The Tunnel Diode Story," by Watters.

JOHN W. HUCKERT, *Primary Examiner.*

HERMAN K. SAALBACH, ARTHUR GAUSS, *Examiners.*